(12) United States Patent
Eastham et al.

(10) Patent No.: US 8,270,293 B2
(45) Date of Patent: Sep. 18, 2012

(54) SYSTEMS AND METHODS FOR EFFICIENT ELECTRONIC COMMUNICATION IN A DISTRIBUTED ROUTING ENVIRONMENT

(75) Inventors: Bryant Eastham, Draper, UT (US); Tom Milligan, South Jordan, UT (US)

(73) Assignee: Panasonic Corporation, Osaka (JP)

( * ) Notice: Subject to any disclaimer, the term of this patent is extended or adjusted under 35 U.S.C. 154(b) by 1389 days.

(21) Appl. No.: 11/292,944

(22) Filed: Dec. 2, 2005

(65) Prior Publication Data

US 2007/0127371 A1    Jun. 7, 2007

(51) Int. Cl.
*G08C 15/00* (2006.01)
(52) U.S. Cl. .................. 370/229; 370/230; 370/395.2; 370/464; 709/225; 709/228; 709/232
(58) Field of Classification Search .................. None
See application file for complete search history.

(56) References Cited

U.S. PATENT DOCUMENTS

| | | | |
|---|---|---|---|
| 5,613,070 A | 3/1997 | Born | |
| 6,320,845 B1 | 11/2001 | Davie | |
| 6,618,764 B1 * | 9/2003 | Shteyn | 709/249 |
| 6,826,148 B1 | 11/2004 | Lee | |
| 6,954,798 B2 | 10/2005 | Eastham | |
| 7,328,282 B2 * | 2/2008 | Ganesan et al. | 709/246 |
| 2002/0052968 A1 * | 5/2002 | Bonefas et al. | 709/231 |
| 2004/0044780 A1 * | 3/2004 | Eastham | 709/229 |
| 2005/0086366 A1 * | 4/2005 | Luebke et al. | 709/238 |
| 2005/0132086 A1 * | 6/2005 | Flurry et al. | 709/238 |
| 2006/0182123 A1 * | 8/2006 | Monette et al. | 370/395.53 |
| 2008/0140835 A1 * | 6/2008 | Bradley et al. | 709/225 |

FOREIGN PATENT DOCUMENTS

WO    2004/098127    11/2004

* cited by examiner

*Primary Examiner* — Chi Pham
*Assistant Examiner* — Mohammad Adhami
(74) *Attorney, Agent, or Firm* — Austin Rapp & Hardman

(57) ABSTRACT

A system for managing communications with a provider is disclosed. A provider includes a provider binding. A requestor requests a requested binding. An intervening access node is in electronic communication with the provider and the requestor. The intervening access node includes program instructions stored in memory and implementing a method for managing communications with a provider. The provider binding is received from the provider. The provider binding is stored. A request signal sent from the requestor specifies the requested binding. It is determined whether the requested binding is provided by the provider. The request signal is sent to the provider only if it is determined that the requested binding is provided by the provider.

18 Claims, 10 Drawing Sheets

SYSTEMS AND METHODS FOR EFFICIENT ELECTRONIC COMMUNICATION IN A DISTRIBUTED ROUTING ENVIRONMENT

TECHNICAL FIELD

The present invention relates generally to computers and computer-related technology. More specifically, the present invention relates to systems and methods for efficient electronic communication in a distributed routing environment.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc.

Some embedded systems may provide data and/or services to other computing devices using a computer network. Alternatively there may be typical computers or computing devices that provide data and/or services to other computing devices using a computer network. Sometimes the provider of the data and/or services may have a suboptimal connection to the computer network. In other situations there may be a great number of providers on the network. These situations, as well as others, may cause inefficiencies in communication across the network. Benefits may be realized if systems and methods were provided to optimize electronic communication in computer networks.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
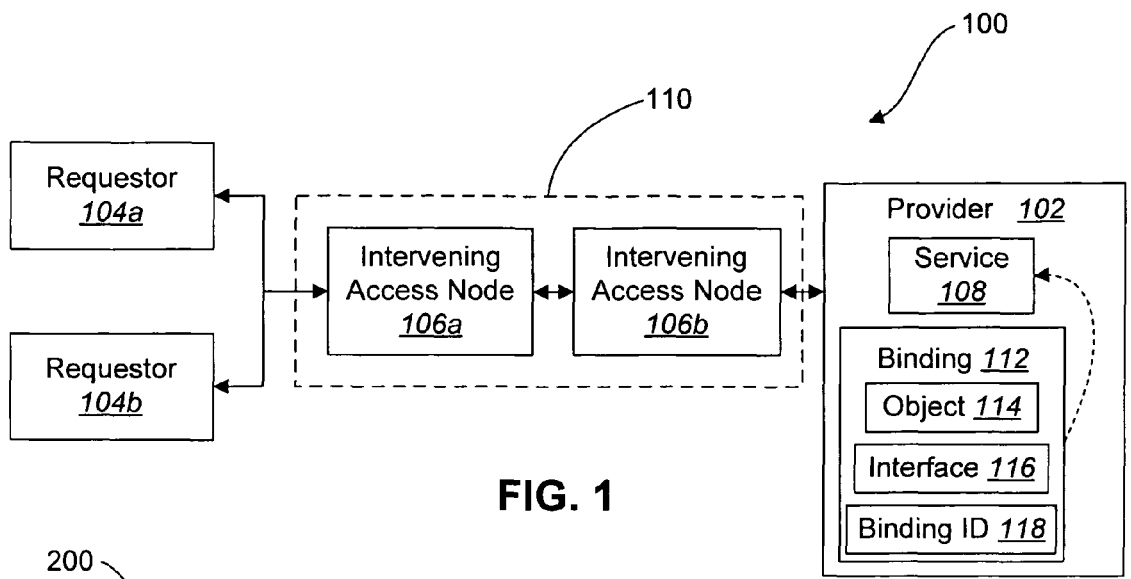
FIG. 1 is a network block diagram illustrating two intervening access nodes in a computer network.

A system for managing communications with a provider is disclosed. A provider includes a provider binding. A requestor requests a requested binding. An intervening access node is in electronic communication with the provider and the requestor. The intervening access node includes program instructions stored in memory and implementing a method for managing communications with a provider. The provider binding is received from the provider. The provider binding is stored. A request signal sent from the requestor specifies the requested binding. It is determined whether the requested binding is provided by the provider by comparing an object of the provider binding with an object from the requested binding. The request signal is sent to the provider only if it is determined that the requested binding is provided by the provider. In some embodiments the request signal may be acknowledged without sending the request signal to the provider.

In certain embodiments it may be determined that the provider is not an intervening access node. Thus, in certain embodiments the provider is not an intervening access node.

The intervening access node may also send the request signal to any other intervening access nodes. A plurality of intervening access nodes may also be included in the system. In this embodiment the method may send the request signal to the plurality of intervening access nodes.

The intervening access node may include a list of request signals received. In addition, the intervening access node may also include a list of providers that are not intervening access nodes. The intervening access node may have a list of bindings for the providers that are not intervening access nodes. The provider binding and the requested binding may each include an object and an interface.

The provider may be embodied in various forms. For example, the provider may be an embedded device that is part of a lighting control system. The provider may be an embedded device that is part of a security system. Additionally, the provider may be an embedded device that is part of a home control system.

A method for managing electronic communications between a requestor and a provider is also disclosed. An intervening access node is in electronic communication with the provider and the requestor. The provider binding is received from the provider at the intervening access node. The provider binding is stored at the intervening access node. A request signal sent from the requester specifies the requested binding. It is determined whether the requested binding is provided by the provider by comparing an object of the provider binding with an object from the requested binding. The request signal is sent to the provider only if it is determined that the requested binding is provided by the provider.

A computing device that is configured to implement a method for managing electronic communications between a requestor and a provider is also disclosed. A processor is in electronic communication with memory. Instructions are stored in the memory and implementing a method. The provider binding is received from the provider at the computing device. The provider binding is stored on the computing device. A request signal sent from the requestor specifies the requested binding. It is determined whether the requested binding is provided by the provider by comparing an object of the provider binding with an object from the requested binding. The request signal is sent to the provider only if it is determined that the requested binding is provided by the provider.

A computer-readable medium comprising executable instructions for implementing a method for managing electronic communications between a requestor and a provider is also disclosed. An intervening access node is in electronic communication with the provider and the requestor. The provider binding is received from the provider at the intervening access node. The provider binding is stored on the intervening access node. A request signal sent from the requestor specifies the requested binding. It is determined whether the requested binding is provided by the provider by comparing an object of the provider binding with an object from the requested binding. The request signal is sent to the provider only if it is determined that the requested binding is provided by the provider. In certain embodiments, other items may be stored including a list of request signals received, a list of providers that are not intervening access nodes, and a list of bindings for the providers that are not intervening access nodes.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a network block diagram illustrating two intervening access nodes in the network 100. A provider 102 is in electronic communication with the network 100. The network embodiment 100 of FIG. 1 includes two requestors 104 in electronic communication with the network 100. The intervening access nodes 106 are also on the network 100. There may be more nodes on the network 100.

An intervening access node 106 is a network node that provides features and services to the network 100. An intervening access node 106 may be used in a variety of ways. For example, an intervening access node 106 may be present on a network to provide services to computers, applications and/or objects on the network 100. An intervening access node 106 may also be used to provide a protocol converter. An intervening access node 106 may be embedded or it 106 may be large enough to handle enterprise traffic.

One feature that an intervening access node 106 may include relates to object refinement. Object refinement refers to the situation where an intervening access node 106 places itself in place of an object and provides different implementations of the same interfaces. This allows, among other things, for problems in the implementation of an interface to be fixed without changing the actual end provider of the interface.

An additional feature of an intervening access node 106 is that of object augmentation. Object augmentation is where the intervening access node 106 adds new interfaces to an object that the end provider does not support.

In current design, the intervening access node 106 does not differentiate between clients and devices, so any service added is available to any (authorized) connected entity or node.

The network as shown in FIG. 1 may inherit many features of web services. Web services are accessed using web protocols, usually HTTP and SOAP. The architecture is based on the peer-to-peer paradigm of networking.

Multiple intervening access nodes 106 in communication with one another form an intervening access node network 110. To requestors 104 and/or providers 102, the one or more intervening access nodes 106 of the intervening access node network 110 appear as a single intervening access node 106. The size or number included in the intervening access node network 110 is transparent to providers 102 and/or requestors 104.

A provider 102 is a node on the network 100 that is the source of a service 108. A requestor 104 is a node on the network 100 that is the user of the service 108. A requestor 104 is a software entity implemented on a node that may directly discover a service 108 to control or interact with it.

The service 108 may be any kind of service that may be provided by a computing device. Some possible examples of services 108 include providing temperature data from a location, providing surveillance data, providing weather information, providing an audio stream, providing a video stream, etc. Many different kinds of services and/or data may be provided over a computer network 100 from a provider 102.

The service 108 is accessed through one or more bindings 112. A binding 112 includes an object identifier 114 and an interface identifier 116. Typically the object 114 and the interface 116 are in pairs. A provider can provide a plurality of bindings. It is possible that multiple providers can be providing the same service 108, binding 112, object 114 or interface 116. Each binding 112 can be represented with a unique binding ID 118. The binding ID 118 must be unique to the network 100.

The provider 102 may be an embedded provider. An embedded provider is a provider 102 being implemented on an embedded device. An embedded device is a type of computing device that does not include all the same components associated with a typical desktop computer. For example, some embedded devices do not include monitors, others do not include a keyboard or a mouse, and some embedded devices do not include either a monitor or a keyboard/mouse. Many embedded devices are microcontroller-based devices, i.e., the central processor for the embedded device is a microcontroller.

The term "network" as used herein refers to a system in which a series of nodes are interconnected by a communications path. A node is a physical computing device that communicates with other nodes. The specific behavior of a node is determined by the applications or software it executes. Applications running on nodes of a network communicate with each other through software modules that implement protocols, formalized rules for how data is sent over a network. Some protocols deal with the timing, sequencing, and error checking of data transmission. Others deal more with how the data is formatted and the commands and responses that the nodes exchange. A set of protocols that work together is called a protocol stack, with each protocol acting as a layer in the stack that is built on top of another layer. The top layer of a protocol stack is used by an application, the middle layers deal with transferring groups (packets and frames) of data between nodes, and the bottom layer deals directly with the networking hardware that transfers data.

Physical networks consist of nodes that are connected by some sort of physical medium (e.g., electrical wire, optical fiber, air). This physical connection may sometimes be referred to as a link. A physical network limited to two nodes may be referred to as point-to-point, while a physical network that may support more than two nodes may be referred to, as multiple-access. Each node on a multiple-access network has a physical address that is used to distinguish it from the other nodes on the network.

Logical networks may be superimposed onto physical networks to specify a unique group of nodes. Each node in a logical network has a logical address that is mapped by a protocol to the node's physical address. A sub-network, or subnet, is a physically or logically independent portion of a network, distinguished by a subnet number.

Most protocols deal with logical networks because most physical network issues already have many well-defined implementations and defining new physical layers is not required. Logical networks also have the benefit of being insulated from the physical network, and are therefore more generally useful. For example, TCP/IP is defined on top of a logical network (IP). IP can run on many physical networks (Ethernet, serial, wireless, etc.). This makes TCP/IP a more generic solution than had it been defined only in terms of some specific physical network.

Figure 2:
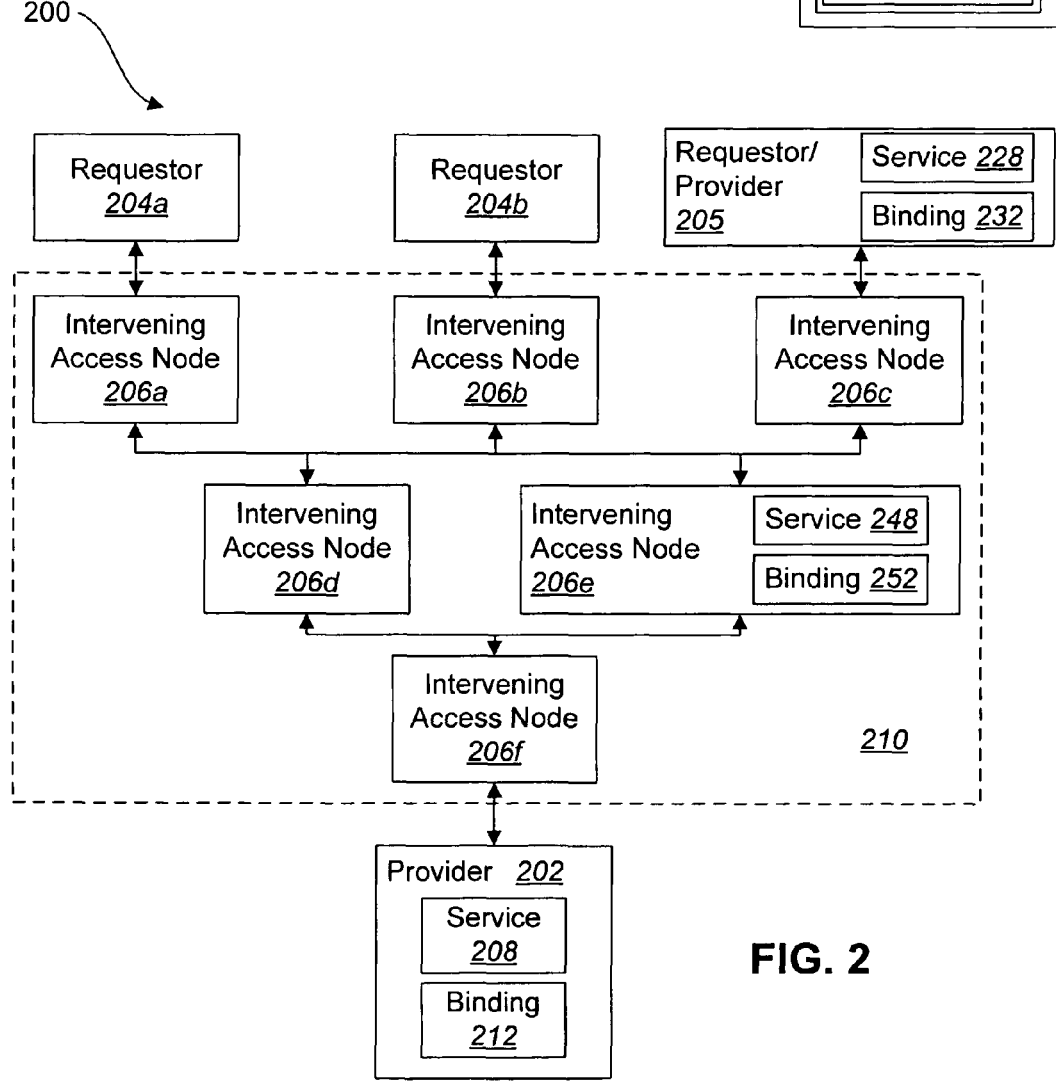
FIG. 2 is a network block diagram illustrating several intervening access nodes in a computer network.

Any number of intervening access nodes 106 may be used in a network 100. FIG. 2 illustrates a network 200 that includes a number of intervening access nodes 206 as shown. Three requestors 204, 205 are in electronic communication with the intervening access nodes 206. In the network embodiment 200 shown in FIG. 2, the three requesters 204, 205 all request the services 208, 228, 248 being provided by the providers 202, 205, 206e. The data from the services 208, 228, 248 is sent through the intervening access node network 210.

The intervening access node network 210 of FIG. 2 operates similarly to the intervening access node network 110 of FIG. 1. In typical operation, the requestors 104, 204, 205 and the providers 102, 202, 205, 206e would not distinguish between the intervening access node network 110 of FIG. 1 and the intervening access node network 210 of FIG. 2. FIG. 2 also illustrates that a node may serve as both a requestor and a provider, as shown by the illustrated requestor/provider 205. This requestor/provider 205 provides a service 228 and binding 232. FIG. 2 also illustrates that a service/binding may be provided by an intervening access node 206e.

As shown above, there may be many services and many bindings that are available on a network. It would be beneficial to allow these services to be "signaled" to provide a binding rather than always providing it. Through the systems and methods disclosed herein, requests are allowed to propagate through the network in an efficient manner, allowing for both loops in the connections and also allowing for a high number of disinterested providers (meaning providers that cannot provide additional services).

The intervening access nodes 106, 206 may be connected in an arbitrary way, which includes loops. In FIGS. 1 and 2 requesters 104, 204, 205 and providers 102, 202, 205, 206e were illustrated. Requestors and providers may be separate nodes or may coexist on an intervening access node.

Figure 3:
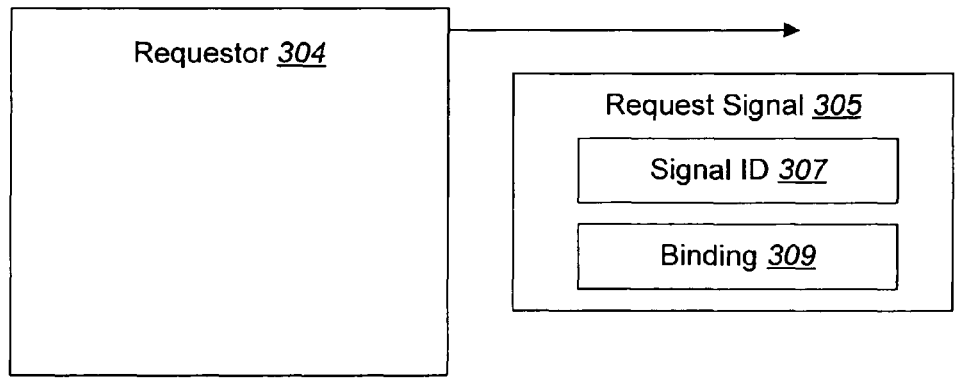
FIG. 3 is a block diagram of a requester sending out a request signal.

Referring now to FIG. 3, when a particular binding 309 is desired by a requestor 304, a request signal 305 is sent through the system. The signal 305 should reach all the intervening access nodes and should reach only the providers that may possibly be capable of providing the binding 309. The request signal 305 includes a signal ID 307 that uniquely identifies the signal and a binding 309 that identifies the binding that is being sought. Because the system of intervening access nodes may contain loops, each signal 305 is uniquely identified. In this way loopback can be detected. It may also be possible for an intermediate node to declare that it is not interested in receiving any signals.

Figure 4:
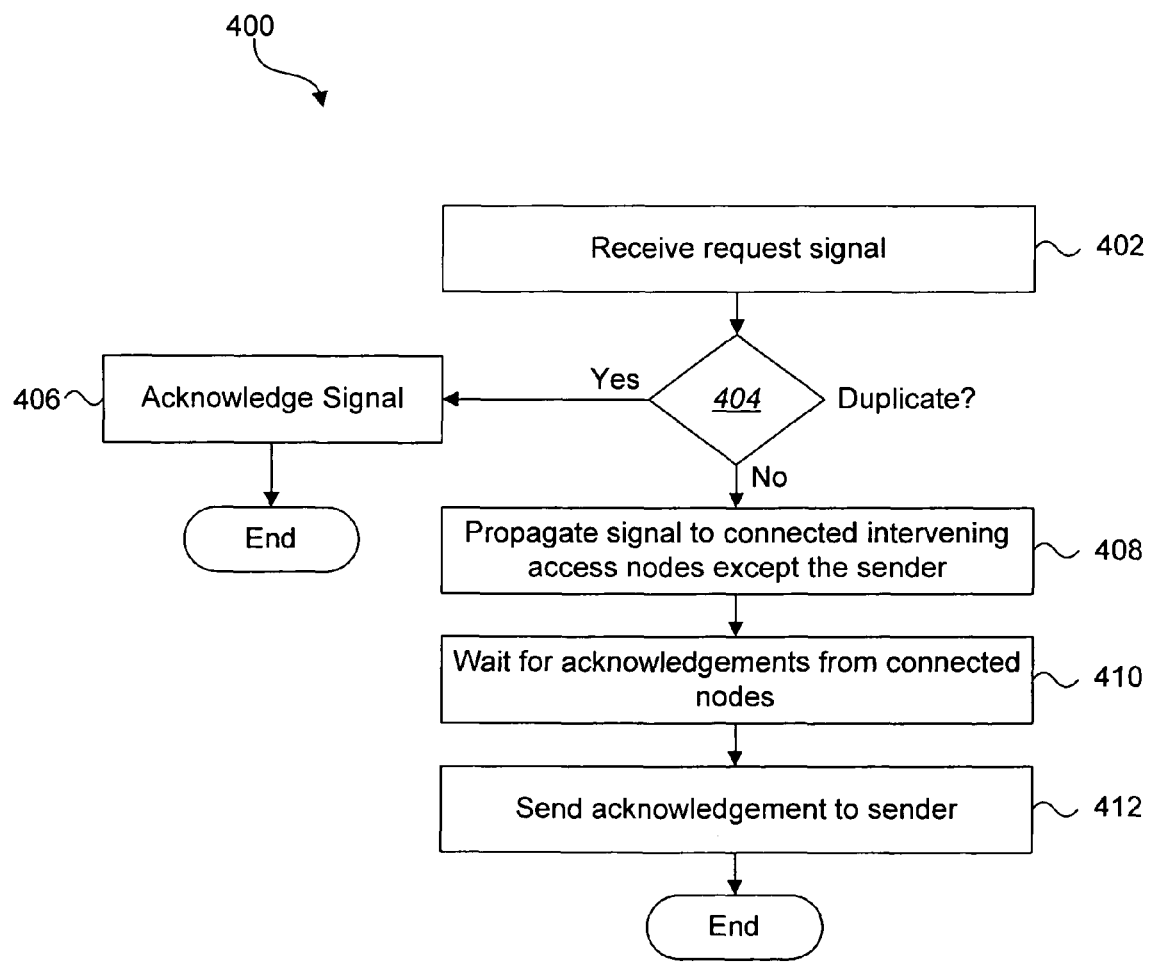
FIG. 4 is a flow diagram illustrating a method for signal propagation by an intervening access node.

FIG. 4 is a flow diagram illustrating a method 400 for signal propagation by an intervening access node 106. A request signal 305 is received 402. Then it is determined 404 whether the request signal 305 is a duplicate by checking the unique identifier 307 of the signal 305. If the signal is a duplicate, then the node acknowledges 406 the signal 305 immediately.

If the signal 305 is not a duplicate, then the signal is propagated 408 to all intervening access nodes that are connected to the present node except for the node that sent the present node the signal. Then the node waits 410 for acknowledgement from the connected nodes that it sent the signal to. When the acknowledgements are received and/or when a timeout is reached, an acknowledgement is sent 412 to the node that sent the present node the signal.

The method 400 as outlined in FIG. 4 results in optimal behavior for intervening nodes 106 that may contain loops. Providers that are directly connected (coexist) on an intermediate node can use the same logic with very low overhead.

Figure 5:
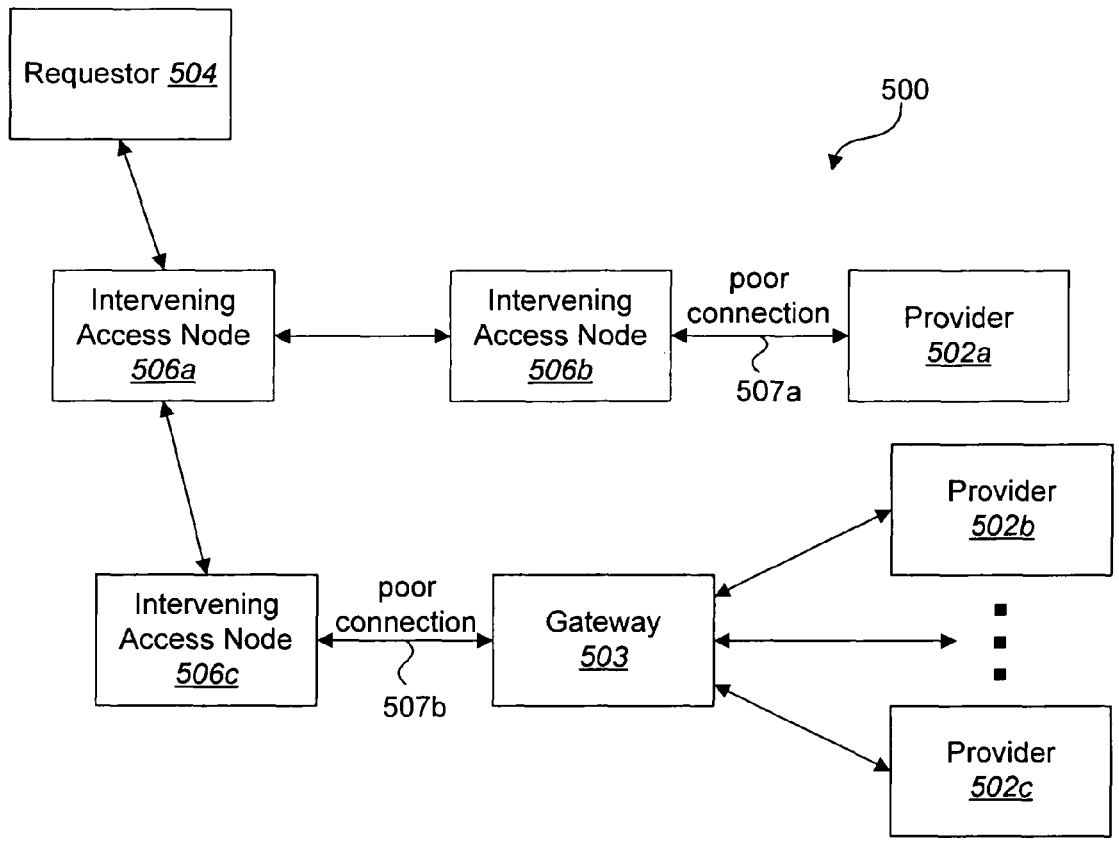
FIG. 5 is a network block diagram illustrating providers connected through suboptimal links.

A problem may exist in how to get the signal to certain providers that are not intervening nodes. FIG. 5 is a block diagram illustrating a network 500 that may cause such issues. The provider nodes 502 that may present problems are typically small embedded devices that may be using a variety of methods to establish connections (like slow modem lines, for example). As shown, a requester 504 is in electronic communication with a set of intervening access nodes 506a-c. One intervening access node 506b is connected to a single provider 502a through a poor connection 507a (e.g., a slow modem, an inconsistent connection, etc.). Another intervening node 506c is connected to a great number of providers 502b-c by a gateway 503. The intervening node 506c has a poor connection 507b with the gateway 503, which is exacerbated by the number of providers 502b-c on the other side of the gateway 503. Because of the type of provider and/or type of connection it has, the logic above in FIG. 4 (sending the signal and waiting for an acknowledgement) would result in poor behavior (slow speeds). A further problem may arise if there are a relatively large number of these difficult providers (devices) connected to the network at any time.

Some filtering logic may be used to determine which of the providers should be signaled. Further, the assumption can be made that these providers are not intermediate nodes, so there is no possibility that they form part of a "loop". The system may assume that a provider is not on an intervening access node if it does not identify itself as an intervening access node or if the type of connection does not meet with certain criteria. This means that the unique identifier 307 of the signal 305 is unused by a non-intervening provider because it will not need to forward the signal to any other node. This also means that there is no need to wait for an acknowledgement from these non-intervening providers.

Based on the above logic, the intervening access node that is connected to a non-intervening provider can determine if the signal should be forwarded by comparing the binding that is requested with the set of bindings that the non-intervening provider is providing. If the non-intervening provider may provide the binding that is being requested, the signal is sent on to that provider. Otherwise the signal is not sent. This determination is made by comparing the object portion of binding 309 and the object portions of each binding 112. Other ways to determine if the signal should be forwarded may be based on configuration or other information known by the intervening node.

Figure 6:
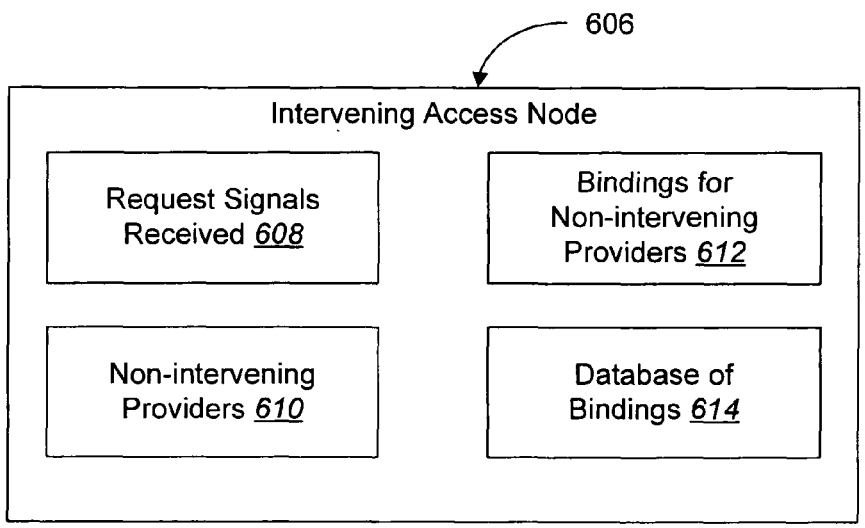
FIG. 6 is a block diagram of an embodiment of an intervening access node.

FIG. 6 is a block diagram of an embodiment of an intervening access node 606. The intervening access node 606 includes the information necessary to enable it to determine whether a request signal 305 should be forwarded on to a provider 102. The intervening node 606 includes a list of the request signals received 608 so that it may determine whether it has already received the request or not. A list of non-intervening providers 610 is also included so that the node 606 can identify the providers that are not intervening access nodes that it is connected to. A list of bindings 612 for the non-intervening providers is also included. The intervening node 606 may use this list to determine whether a request signal should be forwarded on to one or more non-intervening providers. The intervening access node 606 may also include a database of bindings 614 that includes all of the bindings on the network which it is aware of.

Figure 7:
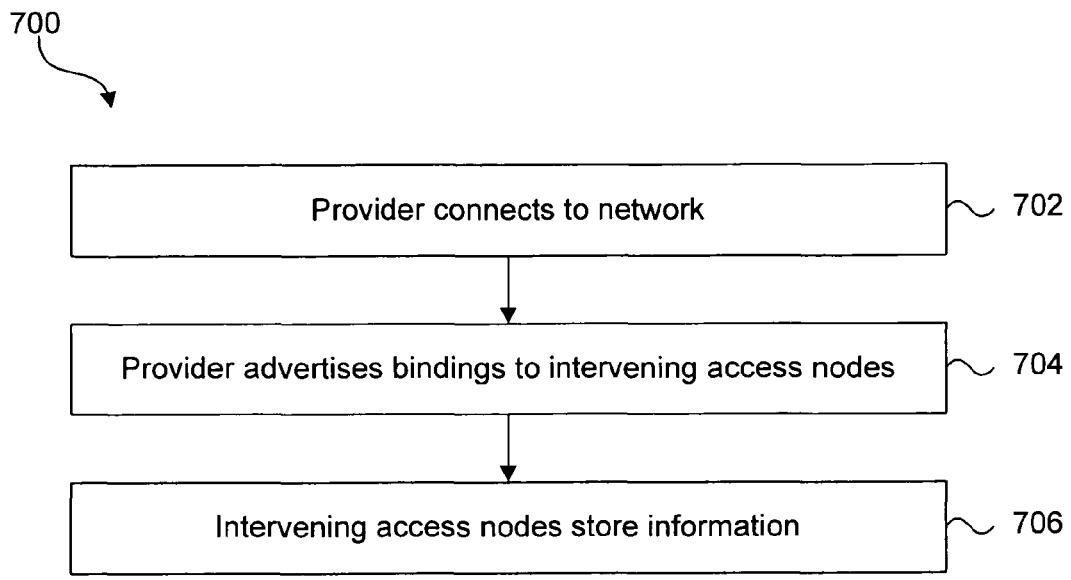
FIG. 7 is a flow diagram of an embodiment of a method of a provider connecting to a network.

FIG. 7 is a flow diagram of an embodiment of a method 700 of a provider 102 connecting to a network 100. The provider 102 connects 702 to the network 100. Then the provider 102 advertises 704 its bindings to the intervening access node 106 in the network 100. When the provider 102 advertises 704 its bindings, its advertisements are received by the intervening access nodes 106 on the network 100. The intervening access nodes 106 then stores 706 this information. At this time the intervening access nodes 106 also store whether the provider is a non-intervening provider. The new provider advertisement that is communicated to one or more nodes may be referred to as an availability notification.

One or more intervening access nodes 106 may be configured to serve as a directory. A directory is a node that provides information to other nodes regarding availability of providers and how to communicate with such providers. Any intervening access nodes 106 serving as directories would store the provider 102 information in the directory.

The roles of requestor and provider can be taken on by devices and software nodes connected to intervening access nodes 106. In addition, an intervening access node 106 may be a requestor and/or a provider. For example, the intervening access node 106 may be a requestor/provider when setting up the communication between intervening access nodes 106. An intervening access node 106 serves as a requestor when it 106 requests information about providers when it 106 connects to another intervening access node 106. An intervening access node 106 serves as provider when it is providing information about other providers to other intervening access nodes 106.

Figure 8:
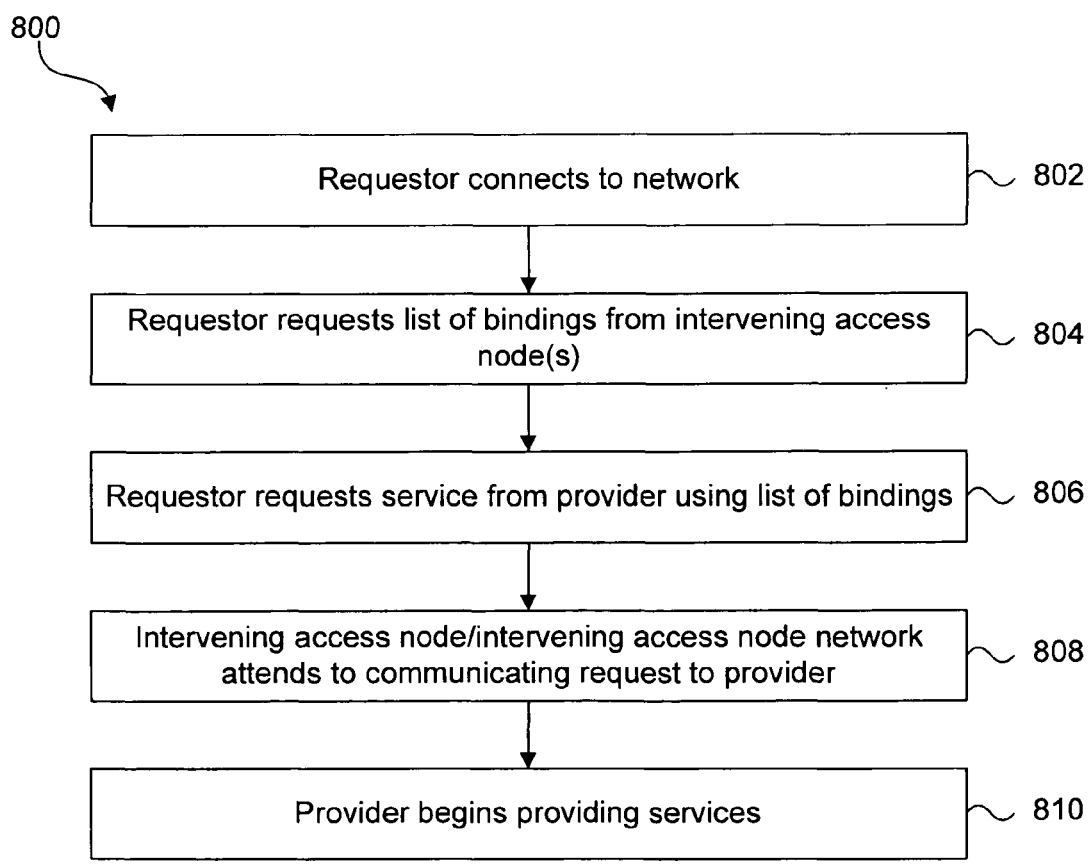
FIG. 8 is a flow diagram of an embodiment of a method of a requestor establishing a service communication link with a provider.

FIG. 8 is a flow diagram of an embodiment of a method 800 of a requestor 104 establishing a service communication link with a network 100. The requestor 104 connects 802 to the network 100. Then the requester 104 may request 804 a list of bindings from the intervening access node(s) 106. Using the list of bindings, the requestor is able to determine what service it needs and it requests 806 the service 108 from a provider 102 by sending a signal 305 including a provider binding 112. The intervening access node network 110, 210 communicates 808 the request from the requestor 104 to the provider 102. The provider 102 then begins providing 810 the service(s) requested.

Figure 9:
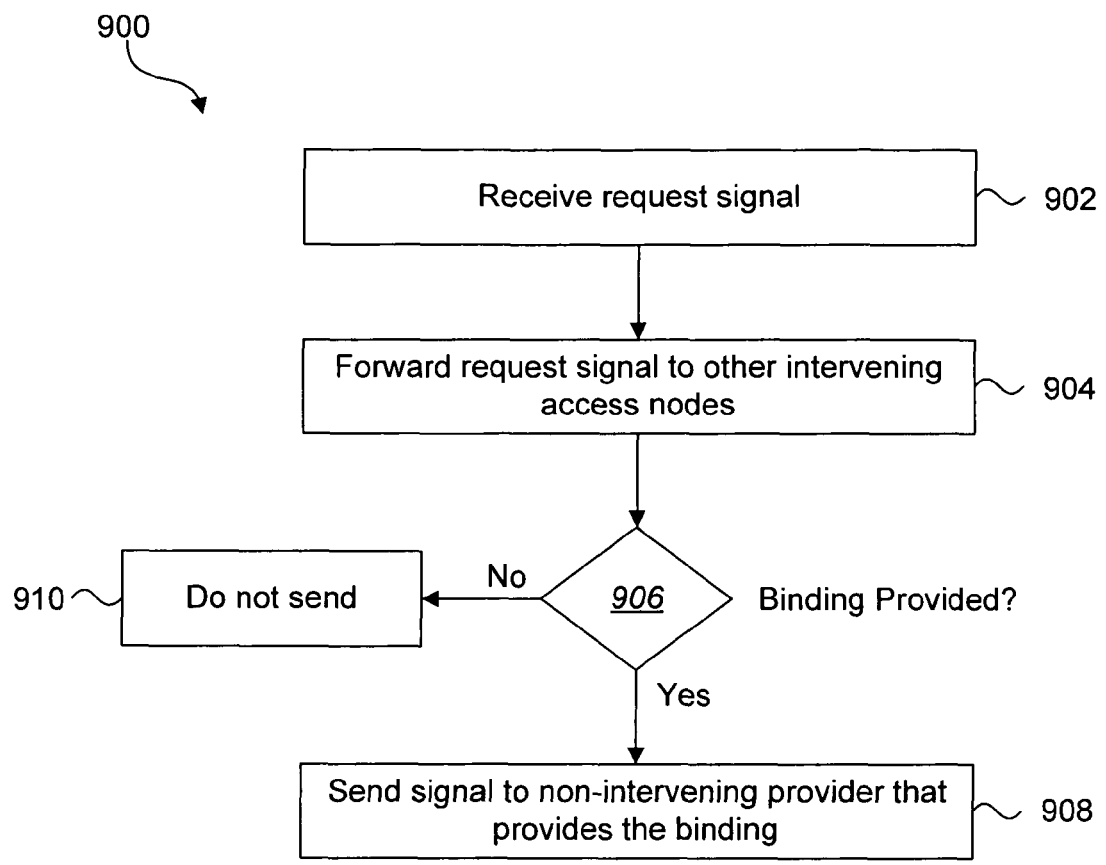
FIG. 9 is a flow diagram of an embodiment of a method of an intervening access node to determine if a request signal should be forwarded on to a particular provider.

FIG. 9 is a flow diagram of an embodiment of a method 900 of an intervening access node to determine if a request signal should be forwarded on to a particular provider. A request signal 305 is received 902 by the access node. The access node then forwards 904 this signal on to any other intervening access nodes. For any non-intervening providers, the access node then determines 906 whether the binding being requested could be provided by the non-intervening providers. The access node may make this determination by examining its non-intervening providers 610 and the bindings 612 from the non-intervening providers to determine whether the binding being requested could be provided by the non-intervening providers. If the non-intervening provider could provide the binding that is being requested, the signal is sent 908 on to that provider. Otherwise the signal is not sent 910.

Figure 10:
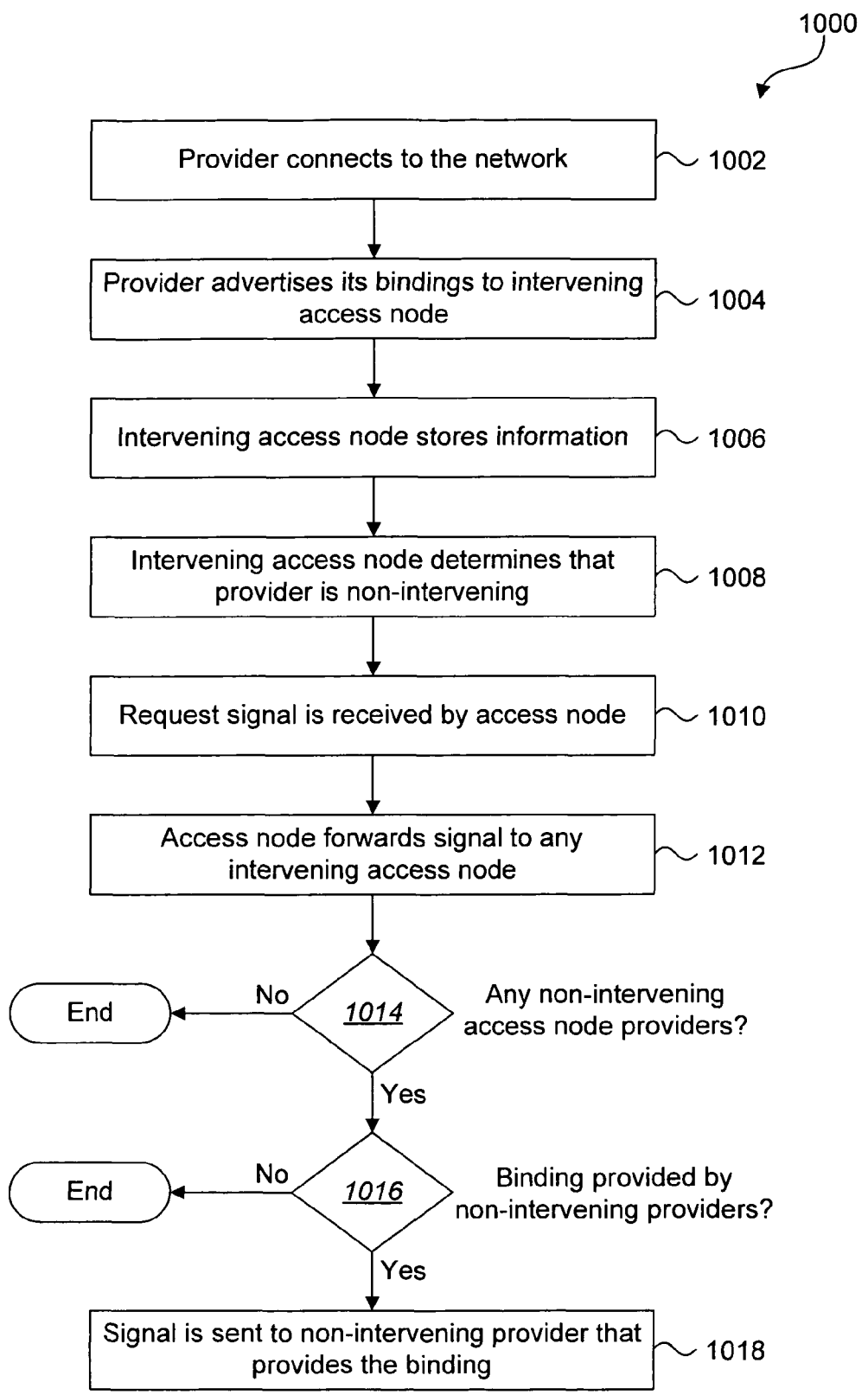
FIG. 10 is a flow diagram of another embodiment of a method of an intervening access node to determine if a request signal should be forwarded on to a particular provider.

FIG. 10 is a flow diagram of another embodiment of a method 1000 of an intervening access node to determine if a request signal should be forwarded on to a particular provider. A provider 102 connects 1002 to the network. Then the provider advertises 1004 its bindings 112 to the intervening access node in the network. When the provider advertises 1004 its bindings, its advertisements are received by the intervening access nodes on the network. The intervening access node then stores 1006 this information. At this time the intervening access nodes also determines 1008 or assumes that the provider is a non-intervening provider based on its quality of network connection considering such factors as whether the connection is persistent, the speed of the network connection, the response time from the provider and the capabilities of the provider.

A request signal is received 1010 by the intervening access node. The intervening access node then forwards 1012 this signal on to any other intervening access nodes. The intervening access node then determines 1014 whether it has any non-intervening access node providers that it is directly connected to. For any non-intervening providers, the intervening access node then determines 1016 whether the binding being requested could be provided by the non-intervening providers. The intervening access node may make this determination by examining its non-intervening providers 610 and the bindings 612 from the non-intervening providers to determine whether the binding being requested could be provided by the non-intervening providers. If the non-intervening provider could provide the binding that is being requested, the signal is sent 1018 on to that provider. Otherwise the signal is not sent on to that non-intervening provider.

Figure 11:
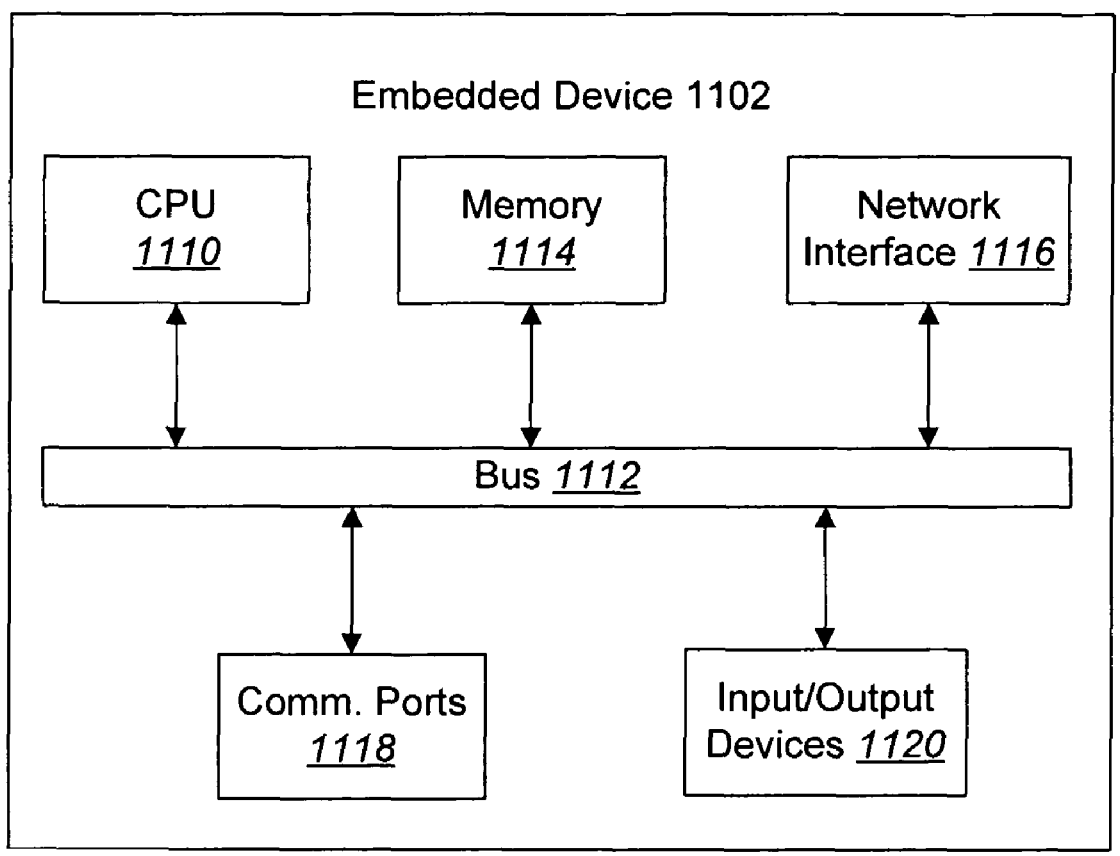
FIG. 11 is a block diagram of hardware components that may be used in an embodiment of an embedded device.

FIG. 11 is a block diagram of hardware components that may be used in an embodiment of an embedded device which may be used as either an embedded provider or as an embedded requester.

A CPU 1110 or processor may be provided to control the operation of the embedded device 1102, including the other components thereof, which are coupled to the CPU 1110 via a bus 1112. The CPU 1110 may be embodied as a microprocessor, microcontroller, digital signal processor or other device known in the art. The CPU 1110 performs logical and arithmetic operations based on program code stored within the memory 1114. In certain embodiments, the memory 1114 may be on-board memory included with the CPU 1110. For example, microcontrollers often include a certain amount of on-board memory.

The embedded device 1102 may also include a network interface 1116. The network interface 1116 facilitates communication between the embedded device 1102 and other devices connected to the network 100. The network 100 may be a pager network, a cellular network, a global communications network, the Internet, a computer network, a telephone network, etc. The network interface 1116 operates according to standard protocols for the applicable network 100.

The embedded device 1102 may also include memory 1114. The memory 1114 may include a random access memory (RAM) for storing temporary data. Alternatively, or in addition, the memory 1114 may include a read-only memory (ROM) for storing more permanent data, such as fixed code and configuration data. The memory 1114 may also be embodied as a magnetic storage device, such as a hard disk drive. The memory 1114 may be any type of electronic device capable of storing electronic information.

The embedded device 1102 may also include communication ports 1118, which facilitate communication with other devices. The embedded device 1102 may also include input/output devices 1120, such as a keyboard, a mouse, a joystick, a touchscreen, a monitor, speakers, a printer, etc.

Figure 12:
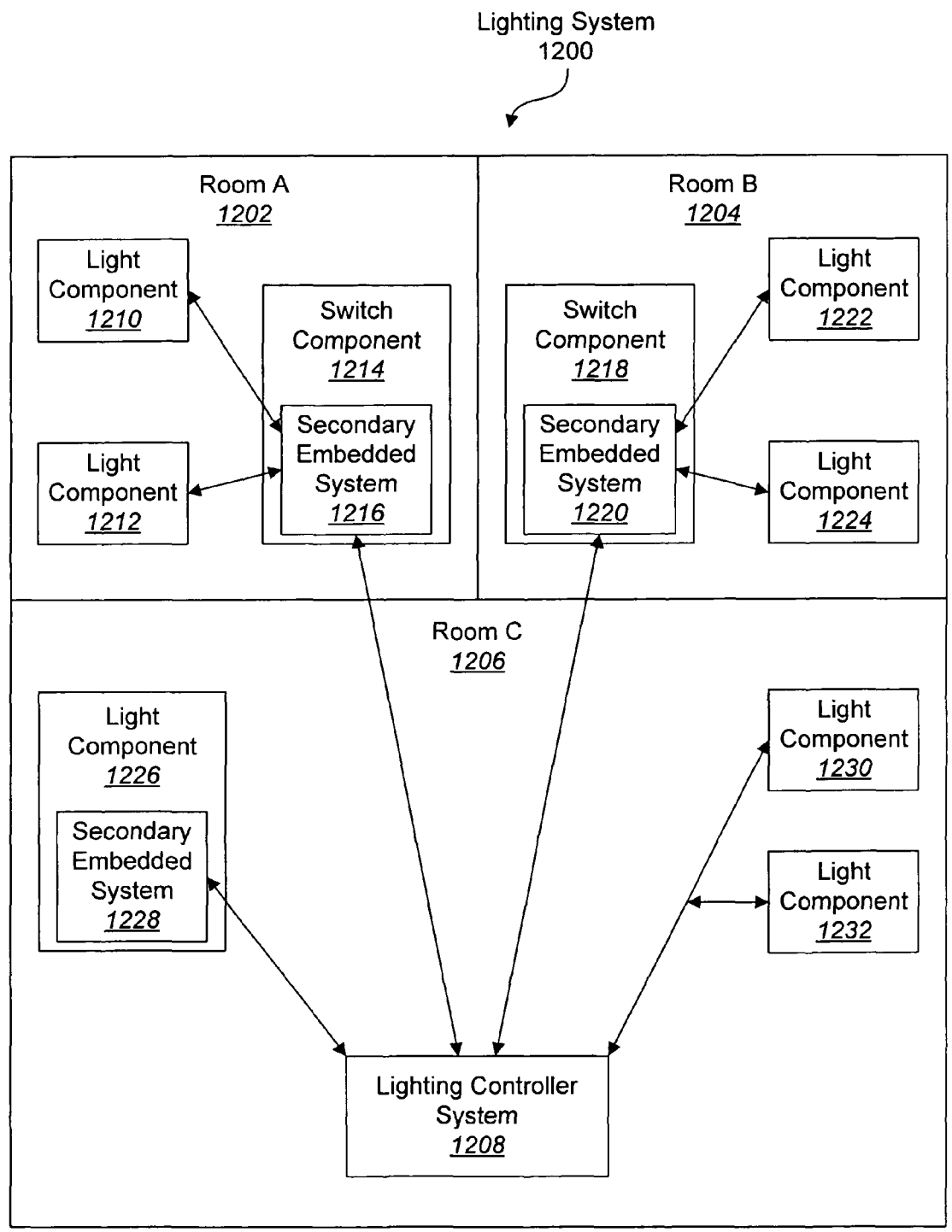
FIG. 12 is a block diagram illustrating a lighting system that may utilize the systems and methods disclosed herein.

The present systems and methods may be used in several contexts. FIG. 12 illustrates one embodiment of a system wherein the present systems and methods may be implemented. FIG. 12 is a block diagram that illustrates one embodiment of a lighting system 1200 that includes a lighting controller system 1208. The lighting system 1200 of FIG. 12 may be incorporated in various rooms in a home. As illustrated, the system 1200 includes a room A 1202, a room B 1204, and a room C 1206. Although three rooms are shown in FIG. 12, the system 1200 may be implemented in any number and variety of rooms within a home, dwelling, or other environment.

The lighting controller system 1208 may monitor and control additional embedded systems and components within the system 1200. In one embodiment, the room A 1202 and the room B 1204 each include a switch component 1214, 1218. The switch components 1214, 1218 may also include a secondary embedded system 1216, 1220. The secondary embedded systems 1216, 1220 may receive instructions from the lighting controller system 1208. The secondary embedded systems 1216, 1220 may then execute these instructions. The instructions may include powering on or powering off various light components 1210, 1212, 1222, and 1224. The instructions may also include dimming the brightness or increasing the brightness of the various light components 1210, 1212, 1222, and 1224. The instructions may further include arranging the brightness of the light components 1210, 1212, 1222, and 1224 in various patterns. The secondary embedded systems 1216, 1220 facilitate the lighting controller system 1208 to monitor and control each light component 1210, 1212, 1222, and 1224 located in the room A 1202 and the room B 1204.

The lighting controller system 1208 might also provide instructions directly to a light component 1226 that includes a secondary embedded system 1228 in the depicted room C 1206. The lighting controller system 1208 may instruct the secondary embedded system 1228 to power down or power up the individual light component 1226. Similarly, the instructions received from the lighting controller system 1208 may include dimming the brightness or increasing the brightness of the individual light component 1226.

The lighting controller system 1208 may also monitor and provide instructions directly to individual light components 1230 and 1232 within the system 1200. These instructions may include similar instructions as described previously.

Figure 13:
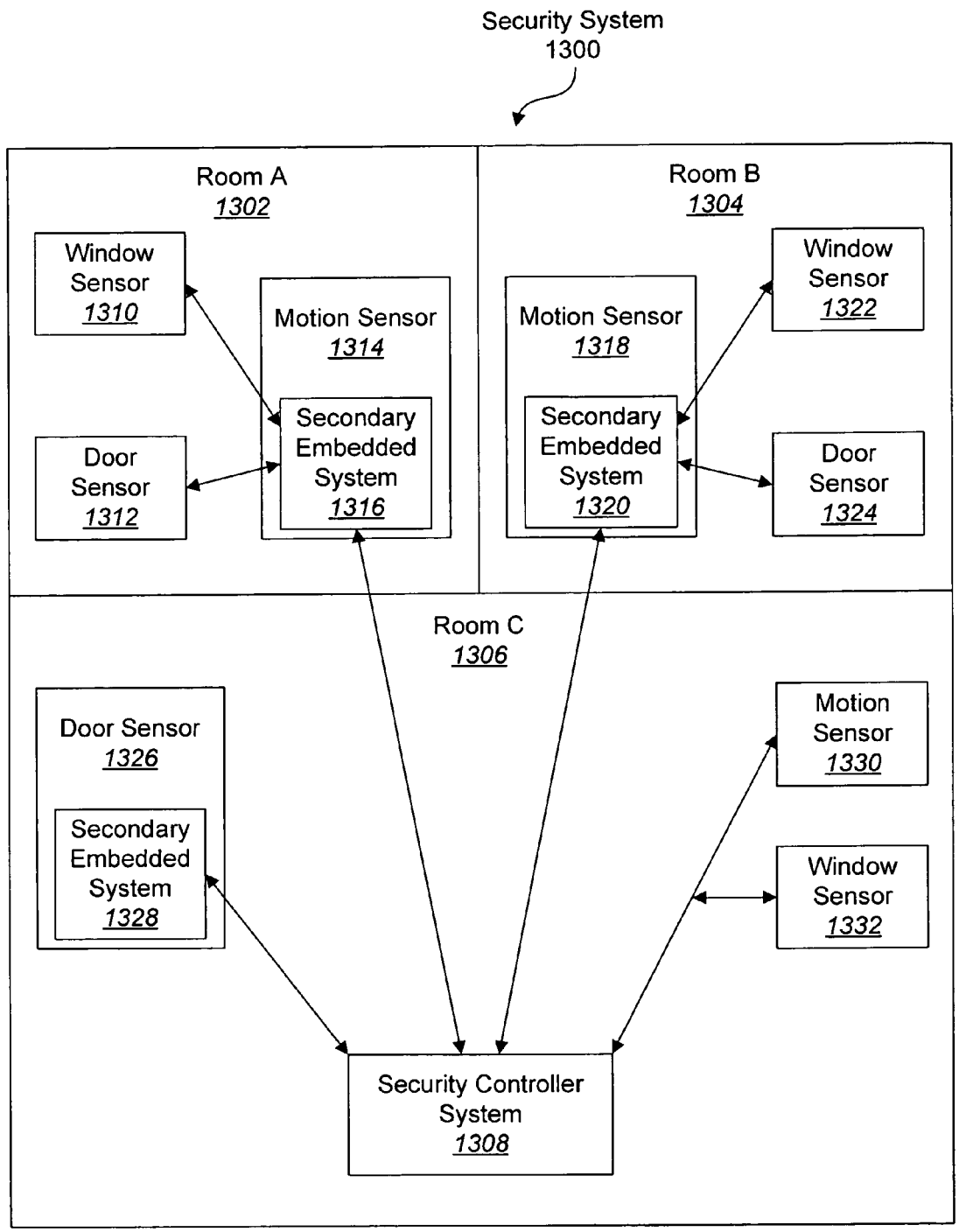
FIG. 13 is a block diagram illustrating a security system that may utilize the systems and methods disclosed herein.

FIG. 13 is an additional embodiment of a system wherein the present systems and methods of the present invention may be implemented. FIG. 13 is a block diagram illustrating a security system 1300. The security system 1300 in the depicted embodiment is implemented in a room A 1302, a room B 1304, and a room C 1306. These rooms may be in the confines of a home or other enclosed environment. The system 1300 may also be implemented in an open environment where the rooms A, B and C, 1302, 1304, and 1306 respectively represent territories or boundaries.

The system 1300 includes a security controller system 1308. The security controller system 1308 monitors and receives information from the various components within the system 1300. For example, a motion sensor 1314, 1318 may include a secondary embedded system 1316, 1320. The motion sensors 1314, 1318 may monitor an immediate space for motion and alert the security controller system 1308 when motion is detected via the secondary embedded system 1316, 1320. The security controller system 1308 may also provide instructions to the various components within the system 1300. For example, the security controller system 1308 may provide instructions to the secondary embedded systems 1316, 1320 to power up or power down a window sensor 1310, 1322 and a door sensor 1312, 1324. In one embodiment, the secondary embedded systems 1316, 1320 notify the security controller system 1308 when the window sensors 1310, 1322 detect movement of a window. Similarly, the secondary embedded systems 1316, 1320 notify the security controller system 1308 when the door sensors 1312, 1324 detect movement of a door. The secondary embedded systems 1316, 1320 may instruct the motion sensors 1314, 1318 to activate the LED (not shown) located within the motion sensors 1314, 1318.

The security controller system 1308 may also monitor and provide instructions directly to individual components within the system 1300. For example, the security controller system 1308 may monitor and provide instructions to power up or power down to a motion sensor 1330 or a window sensor 1332. The security controller system 1308 may also instruct the motion sensor 1330 and the window sensor 1332 to activate the LED (not shown) or audio alert notifications within the sensors 1330 and 1332.

Each individual component comprising the system 1300 may also include a secondary embedded system. For example, FIG. 13 illustrates a door sensor 1326 including a secondary embedded system 1328. The security controller system 1308 may monitor and provide instructions to the secondary embedded system 1328 in a similar manner as previously described.

Figure 14:
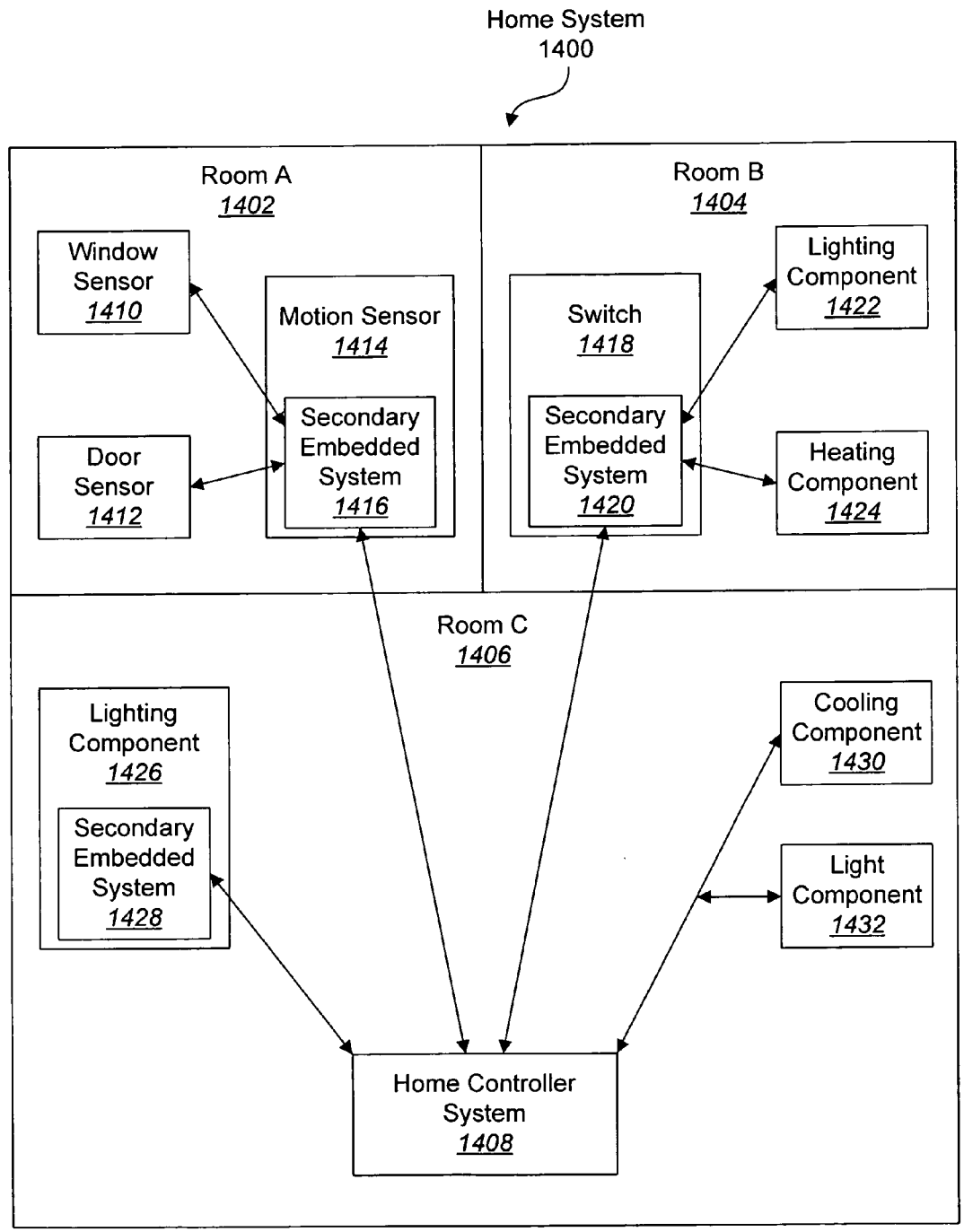
FIG. 14 is a block diagram illustrating a home system that may utilize the systems and methods disclosed herein.

FIG. 14 is a block diagram illustrating one embodiment of a home system 1400. The home system 1400 includes a home controller 1408 that facilitates the monitoring of various systems such as the lighting system 1200, the security system 1300, and the like. The home system 1400 allows a user to control various components and systems through one or more embedded systems. In one embodiment, the home controller system 1408 monitors and provides information in the same manner as previously described in relation to FIGS. 12 and 13. In the depicted embodiment, the home controller 1408 provides instructions to a heating component 1424 via a secondary embedded system 1420. The heating component 1424 may include a furnace or other heating device typically found in resident locations or offices. The home controller system 1408 may provide instructions to power up or power down the heating component 1424 via the secondary embedded system 1420.

Similarly, the home controller 1408 may monitor and provide instructions directly to a component within the home system 1400 such as a cooling component 1430. The cooling component 1430 may include an air conditioner or other cooling device typically found in resident locations or offices. The central home controller 1408 may instruct the cooling component 1430 to power up or power down depending on the temperature reading collected by the central embedded system 1408. The home system 1400 functions in a similar manner as previously described in relation to FIGS. 12 and 13.

There are many types of embedded devices and many reasons for creating device networks. Several examples of device networking applications will be set forth. It will be appreciated by those skilled in the art that the examples discussed are not exhaustive.

One example of a device networking application is remote monitoring. Many useful device networks involve remote monitoring, the one-way transfer of information from one node to another. In these applications, providers typically act as small servers that report certain information in response to a requester. Providers can also be set up to publish their state information to subscribers. A requester may ask for periodic reports or for updates whenever the state changes, perhaps with some means of limiting how often updates are to be sent. Providers can be set up to notify requestors when some event or exceptional condition occurs.

Another example of a device network application is remote control, where requesters are able to send commands to providers to invoke some specific action. In most cases, remote control involves some sort of feedback.

A still further example of a device networking application is distributed control systems. The functions and data associated with individual providers can be combined and coordinated through a network to create a distributed system that provides additional value. Sometimes these distributed control systems can be established more or less automatically. In many cases, a more sophisticated device joins a peer-to-peer network to perform configuration, monitoring or diagnostic duties. Such systems may be created by objects that communicate as peers or through a master-slave configuration, in which each object in the system communicates with a single, central node that contains all of the control logic.

With each category of networking application, there are a variety of ways in which requestors may connect to providers. When a relatively small number of providers are involved, a requestor may use a web browser, pager or even a WAP-enabled cell phone to communicate with a provider in a more or less interactive manner. As the number of providers grows, however, these methods may become unworkable and requestors may employ more general data management techniques such as a spreadsheet or database application.

As a variety of networks are implemented over time and with different technologies, the situation can arise in which multiple networks might sit in the same home or facility, each using their own protocols and unable to communicate with the others. In this case the various networks and protocols can be bridged to create a single, larger network. This can allow a single application to access each provider, simplifying the interaction with all of the providers.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A system for managing communications with a provider, the system comprising:
   a provider that provides a provider binding;
   a requestor that has requested a requested binding;
   an intervening access node in electronic communication with the provider and the requestor, wherein the intervening access node comprises program instructions stored in memory that are executable to:
   determine whether the provider is a non-intervening provider or an intervening provider;
   receive the provider binding from the provider;
   store the provider binding;
   receive a request signal sent from the requestor that specifies the requested binding, wherein the request signal sent from the requestor is received after the provider binding has been stored;
   determine whether the request signal is a duplicate by checking a unique identifier of the request signal, and if it is determined that the request signal is a duplicate, acknowledging the request signal;
   determine whether the requested binding is provided by the provider, wherein the determining is achieved by comparing an object of the provider binding with an object from the requested binding;
   send the request signal to the provider if the provider is an intervening provider; and send the request signal to a non-intervening provider only if it is determined that the requested binding is provided by the non-intervening provider.

2. The system as defined in claim 1, wherein the provider binding and the requested binding each comprise an object and an interface.

3. The system as defined in claim 2, wherein the system further comprises a plurality of intervening access nodes, wherein the instructions are further executable to send the request signal to the plurality of intervening access nodes, and wherein the instructions are further executable to provide the stored provider binding to the plurality of intervening access nodes in order to share the stored provider binding.

4. The system as defined in claim 1, wherein the instructions stored in the memory by the intervening access node are further executable to send the request signal to any other intervening access nodes.

5. The system as defined in claim 1, wherein the instructions stored in the memory by the intervening access node are further executable to acknowledge the request signal without sending the request signal to the provider.

6. The system as defined in claim 1, wherein the intervening access node further comprises a list of request signals received.

7. The system as defined in claim 6, wherein the intervening access node further comprises a list of providers that are non-intervening providers.

8. The system as defined in claim 7, wherein the intervening access node further comprises a list of bindings for the providers that are non-intervening providers.

9. The system as defined in claim 1, wherein the provider is an embedded device that is part of a lighting control system.

10. The system as defined in claim 1, wherein the provider is an embedded device that is part of a security system.

11. The system as defined in claim 1, wherein the provider is an embedded device that is part of a home control system.

12. A method for managing electronic communications between a requestor and a provider, the method comprising:
providing an intervening access node in electronic communication with a provider and a requestor;
determining whether the provider is a non-intervening provider or an intervening provider;
receiving a provider binding from the provider at the intervening access node;
storing the provider binding on the intervening access node;
receiving a request signal sent from the requestor that specifies a requested binding, wherein the request signal sent from the requestor is received after the provider binding has been stored;
determining whether the request signal is a duplicate by checking a unique identifier of the request signal, and if it is determined that the request signal is a duplicate, acknowledging the request signal;
determining whether the requested binding is provided by the provider, wherein the determining is achieved by comparing an object of the provider binding with an object from the requested binding;
sending the request signal to the provider if the provider is an intervening provider; and
sending the request signal to a non-intervening provider only if it is determined that the requested binding is provided by the non-intervening provider.

13. The method as defined in claim 12, further comprising sending the request signal to any other intervening access nodes and providing the stored provider binding to any other intervening access nodes in order to share the stored provider binding.

14. The method as defined in claim 13, further comprising accessing a list of bindings for providers that are non-intervening providers.

15. A computing device that is configured to implement a method for managing electronic communications between a requestor and a provider, the computing device comprising:
a processor;
memory in electronic communication with the processor;
instructions stored in the memory, the instructions being executable to:
determine whether the provider is a non-intervening provider or an intervening provider;
receive a provider binding from a provider at the computing device;
store the provider binding on the computing device;
receive a request signal sent from a requestor that specifies a requested binding, wherein the request signal sent from the requestor is received after the provider binding has been stored;
determine whether the request signal is a duplicate by checking a unique identifier of the request signal, and if it is determined that the request signal is a duplicate, acknowledging the request signal;
determine whether the requested binding is provided by the provider, wherein the determining is achieved by comparing an object of the provider binding with an object from the requested binding;
send the request signal to the provider if the provider is an intervening provider; and
send the request signal to a non-intervening provider only if it is determined that the requested binding is provided by the non-intervening provider.

16. A non-transitory computer-readable medium comprising executable instructions for managing electronic communications between a requestor and a provider, the instructions being executable to:
provide an intervening access node in electronic communication with a provider and a requestor;
determine whether the provider is a non-intervening provider or an intervening provider;
receive a provider binding from the provider at the intervening access node;
store the provider binding on the intervening access node;
receive a request signal sent from the requestor that specifies a requested binding, wherein the request signal sent from the requestor is received after the provider binding has been stored;
determine whether the request signal is a duplicate by checking a unique identifier of the request signal, and if it is determined that the request signal is a duplicate, acknowledging the request signal;
determine whether the requested binding is provided by the provider, wherein the determining is achieved by comparing an object of the provider binding with an object from the requested binding;
send the request signal to the provider if the provider is an intervening provider; and
send the request signal to a non-intervening provider only if it is determined that the requested binding is provided by the non-intervening provider.

17. The non-transitory computer-readable medium of claim 16, wherein the instructions are further executable to:
store a list of request signals received;

store a list of providers that are non-intervening providers; and store a list of bindings for the providers that are non-intervening providers.

18. The system as defined in claim 1, wherein the instructions executable to determine whether the provider is a non-intervening provider or an intervening provider comprise instructions executable to examine the quality of the network connection used to communicate with the provider.

* * * * *

UNITED STATES PATENT AND TRADEMARK OFFICE
CERTIFICATE OF CORRECTION

PATENT NO. : 8,270,293 B2  
APPLICATION NO. : 11/292944  
DATED : September 18, 2012  
INVENTOR(S) : Bryant Eastham et al.

Page 1 of 1

It is certified that error appears in the above-identified patent and that said Letters Patent is hereby corrected as shown below:

In the Specifications:

In column 3, line 12, delete "requester" and replace it with --requestor--.

In column 4, line 23, delete "requester" and replace it with --requestor--.

In column 7, line 22, delete "requesters" and replace it with --requestors--.

In column 7, line 49, delete "requesters" and replace with --requestors--.

In column 8, line 21, delete "requester" and replace it with --requestor--.

In column 9, line 42, delete "requester" and replace it with --requestor--.

In column 10, line 34, delete "requester" and replace it with --requestor--.

In column 12, line 66, delete "requester" and replace it with --requestor--.

In column 12, line 67, delete "requester" and replace it with --requestor--.

Signed and Sealed this  
Twenty-eighth Day of May, 2013

Teresa Stanek Rea  
*Acting Director of the United States Patent and Trademark Office*